United States Patent [19]
Hinton

[11] 4,084,976
[45] Apr. 18, 1978

[54] LEAD-FREE GLAZE FOR ALUMINA BODIES

[75] Inventor: Jonathan W. Hinton, Southfield, Mich.

[73] Assignee: Champion Spark Plug Company, Toledo, Ohio

[21] Appl. No.: 817,194

[22] Filed: Jul. 20, 1977

[51] Int. Cl.[2] C03C 3/08; C03C 5/02

[52] U.S. Cl. 106/48; 29/25.12; 106/46; 106/52; 106/54; 313/118; 428/432

[58] Field of Search 106/48, 52, 54, 73.4, 106/46; 313/118

[56] References Cited

U.S. PATENT DOCUMENTS

| 3,790,842 | 2/1974 | Westenkirchner et al. | 313/118 |
|---|---|---|---|
| 3,927,238 | 12/1975 | Di Marcello | 106/48 |

OTHER PUBLICATIONS

Parmelee, C. W., "Ceramic Glazes", (1951), pub. by Industrial Publications, Chicago, Ill., pp. 169, 173–176.

*Primary Examiner*—Helen M. McCarthy
*Attorney, Agent, or Firm*—John C. Purdue

[57] ABSTRACT

A high-silica ceramic glaze, having a low coefficient of thermal expansion, suitable for application to alumina bodies, is disclosed. The glaze comprises, by weight percent, about 50 percent $SiO_2$, from 5 to 8 percent $Al_2O_3$, from 6 to 12 percent $B_2O_3$, from 2 to 15 percent BaO, from 5 to 8 percent SrO, from 4 to 6 percent CaO, from 2 to 8 percent MgO, from 1 to 2 percent ZnO, and about 5 percent total of $Na_2O$, $K_2O$, $Li_2O$, and minor impurities.

6 Claims, No Drawings

LEAD-FREE GLAZE FOR ALUMINA BODIES

BACKGROUND OF THE INVENTION

This invention is directed to a lead-free ceramic glaze.

Glazes are continuous coatings which are usually prepared from fused silicate mixtures and are fusion-bonded to ceramic substrates. A glaze is used on a ceramic substrate to serve one or more of the following purposes: (1) to render the substrate impermeable to liquids and gases, (2) for aesthetic reasons, including covering blemishes and providing decorative effects, (3) to provide protective coatings, and (4) to increase strength.

The exterior exposed portion of a spark plug insulator is exposed to dirt and grease which may result in the formation of an electrically conducting surface, resulting in premature failure of the spark plug. Alumina insulator bodies are coated with a ceramic glaze in order to minimize dirt and grease build-up, and to increase the strength and imperviousness of the surface. Depending on the particular properties desired, the glaze can be modified to change the maturing temperature, to add color or to modify the coefficient of thermal expansion.

Glazes applied to alumina substrates must have a low thermal coefficient of expansion, similar to that of the alumina substrate, to avoid undue stresses which can cause spalling, chipping, cracking or crazing of the glaze; from 6 to 7 micro inches per inch per ° C is a typical range of coefficient of thermal expansion for alumina bodies. A low coefficient of thermal expansion also strengthens the insulator by inducing compressive stresses at the surface of the glaze-insulator composite. Because glazes involve highly complex multicomponent systems, it is difficult to predict the effect of varying or substituting chemical compounds in a glaze formulation, even though general properties of some of the individual components are known. Furthermore, because a glaze is not homogeneous, that is, it may contain one or more dispersed undissolved phases, the ultimate components shown by chemical analysis do not describe a glaze such that the properties are easily predictable.

Because the oxides and carbonates of lead enter easily into combination with silica and boric acid, lead finds extensive use in glazes. The addition of lead to a glaze lowers the coefficient of thermal expansion and lowers the modulus of elasticity; lead also decreases melt viscosity, reduces the danger of devitrification, broadens the maturing range, and lowers the surface tension of molten glazes, helping to homogenize the glaze and form a defect-free surface.

However, the use of lead compounds in glazes has numerous disadvantages, including a decrease in the abrasion resistance of the glaze, and volatility when fired above cone 6 or 7.

A more serious problem is the toxic nature of the lead compounds used in glazes. Occupational exposure to lead compounds may provide an opportunity for ingestion and subsequent lead extraction by digestive acids. The danger from lead poisoning is amplified because the lead tends to accumulate in the body in the central nervous system. Increased concern and knowledge relating to environmental health and safety have made it increasingly desirable to substitute a lead-free glaze for lead-containing glazes presently in use. In order to be suitable, lead-free glazes must be nontoxic and available in large amounts at a reasonable cost. For transparent glazes with underglaze decorations, the replacement must be non-coloring.

SUMMARY

This invention relates to lead-free glazes useful for application to alumina substrates. The glaze comprises from 50 to 54 percent by weight $SiO_2$, from 5 to 8 percent by weight $Al_2O_3$, from 6 to 12 percent by weight $B_2O_3$, from 4 to 6 percent by weight CaO, from 2 to 8 percent by weight MgO, from 2 to 15 percent by weight BaO, from 5 to 8 percent by weight SrO, from 1 to 2 percent by weight ZnO, and from 4 to 6 percent by weight $Na_2O$, $K_2O$, and $Li_2O$. Minor amounts of impurities, e.g., $Fe_2O_3$, and $ZrO_2$, or both are sometimes present as unnecessary, but harmless ingredients.

It is an object of the invention to provide lead-free glazes.

It is a further object of this invention to provide lead-free glazes having a coefficient of thermal expansion similar to high-alumina substrates.

Other objects and benefits of this invention will be apparent from the following disclosure.

EXAMPLE 1

A high alumina substrate, containing about 90 percent by weight $Al_2O_3$, 7.2 percent by weight $SiO_2$, 1.5 percent by weight CaO, and 0.7 percent by weight MgO, was coated with a lead-free glaze having the following composition:

| OXIDE | WEIGHT PERCENT |
|---|---|
| $SiO_2$ | 51.7 |
| $Al_2O_3$ | 6.0 |
| $B_2O_3$ | 9.4 |
| CaO | 4.9 |
| MgO | 4.5 |
| BaO | 9.0 |
| SrO | 6.8 |
| ZnO | 1.9 |
| $Na_2O$ | 1.7 |
| $K_2O$ | 2.9 |
| $Li_2O$ | 0.5 |
| Minor Impurities | 0.6 |

The glaze-coated alumina body was fired at 2120° F and produced a smooth, uniform coating of high gloss and good strength. There was no evidence of crazing or devitrification present in the glaze. The average strength increase obtained by the fired glaze was about 44 percent.

EXAMPLES II–IV

The above procedure was repeated with similar results for glazes of the following compositions:

| OXIDE | WEIGHT PERCENT II | III | IV |
|---|---|---|---|
| $SiO_2$ | 53.7 | 51.2 | 52.4 |
| $Al_2O_3$ | 6.3 | 7.0 | 5.1 |
| $B_2O_3$ | 9.8 | 7.1 | 11.7 |
| CaO | 5.1 | 4.9 | 4.9 |
| MgO | 6.1 | 2.3 | 6.9 |
| BaO | 4.0 | 14.7 | 3.3 |
| SrO | 7.1 | 5.9 | 7.8 |
| ZnO | 1.9 | 1.8 | 2.0 |
| $Na_2O$ | 1.8 | 1.4 | 2.0 |
| $K_2O$ | 3.0 | 2.9 | 2.9 |
| $Li_2O$ | 0.5 | 0.4 | 0.7 |
| Minor Impurities | 0.6 | 0.7 | 0.3 |

As previously referred to, the ultimate composition of a glaze is highly complex. The compositions described above contain eleven or more oxides. Even though it might not be possible to quantitatively predict the behavior of a glaze, it is desirable that some degree of comprehension and control be achieved.

The raw materials of glazes are almost always oxides or compounds that can be expressed as oxides, thus enabling the components to be described in terms of phase compositions, having known characteristics. Because of this, glaze ceramists commonly use a system of expressing oxide compositions in terms of molar proportions, ie, molecular equivalents. By means of molecular equivalents, an empirical oxide formula can be calculated for each glaze composition.

For purposes of arriving at an empirical molecular formula, all oxides are classified as either basic, "neutral" (amphoteric), or acid. The glaze oxides which are classified as bases, such as alkali or alkaline earth oxides, are designated as "$R_2O$" and "RO" respectively. Moles of "neutral" or amphoteric oxides are designated as "$R_2O_3$" and moles of acid oxides are designated as $RO_2$.

On an empirical molecular formula basis, the glaze composition set forth in Example I is shown in the table below:

| CHEMICAL ANALYSIS | | | | MOLES | |
|---|---|---|---|---|---|
| Oxide | Symbol | Weight* % | Molecular Wt. | (Wt./Molecular Wt.) | "Normalized" Mole Fraction |
| $SiO_2$ | $RO_2$ | 51.74 | 60.1 | 0.861 | 2.04 |
| $Al_2O_3$ | $R_2O_3$ | 6.04 | 102.0 | 0.059 | 0.14 |
| $B_2O_3$ | $R_2O_3$ | 9.38 | 69.6 | 0.135 | 0.32 |
| CaO | RO | 4.88 | 56.1 | 0.087 | 0.21 |
| MgO | RO | 4.52 | 40.3 | 0.112 | 0.26 |
| BaO | RO | 8.98 | 153.3 | 0.059 | 0.14 |
| SrO | RO | 6.81 | 103.6 | 0.066 | 0.16 |
| ZnO | RO | 1.87 | 81.4 | 0.023 | 0.05 |
| $Na_2O$ | R hd 2O | 1.71 | 62.0 | 0.028 | 0.07 |
| $K_2O$ | $R_2O$ | 2.94 | 94.2 | 0.031 | 0.07 |
| $Li_2O$ | $R_2O$ | 0.52 | 29.9 | 0.017 | 0.04 |
| Minor Impurities | | 0.61 | | | |

*Weight percentages are reported to two points after the decimal for completeness, and not as an indication of criticality.

In establishing the empirical formula for a glaze, the formula is "normalized" so that the sum of $R_2O$ and RO is brought to unity. In Example I, the sum of RO plus $R_2O$ equals 0.423 moles; dividing each of the moles obtained by the total moles of RO and $R_2O$ establishes the empirical formula for the glaze given in the last column as "normalized mole fraction". By means of the empirical formula, the calculation of "batch weights" or the calculation of a glaze from a given formula is simplified, especially if it is desired to formulate the glaze from compounds other than oxides, such as for example, carbonates. Comparison of glaze formulations is thereby greatly simplified.

In general, the oxides which are present in the instant invention possess the following properties. The $SiO_2$ is macroscopically miscible at all temperatures. Control of the amount of silica is important, since if the silica is too high, the glaze becomes excessively refractory; if the silica is too low, the glaze becomes too soluble and, therefore, unstable. The amount and character of the other elements present greatly modifies the effect of the silica present. The alumina increases the viscosity and retards macrocrystalline growth. High viscosity is undesirable in a glaze because it prevents healing of pinholes, scratches, and other minor surface flaws. The alkalies are strong fluxes and increase the fluidity of the molten glaze. Increasing the amount of alkali compounds present in the glaze increases the coefficient of thermal expansion, and has a direct bearing upon crazing of the glaze. The alkaline earths also act as vigorous fluxes in a glaze composition. For example, CaO acts as a flux at temperatures of cone 4 and above; excess calcia can cause refractoriness and devitrification, leading to a low-gloss matte texture, possibly as the result of formation of anorthite ($CaO.SiO_2$). Magnesia acts as a vigorous flux at higher temperatures, and lowers the coefficient of thermal expansion to a much greater degree than other bases. The oxides of strontium, barium and zinc also act a fluxes.

The above examples and experimental test results on a series of lead-free glazes indicate that the normalized molecular formula should contain from about 0.15 to 0.19 mole of $R_2O$, about 0.05 mole of ZnO and from 0.4 to 0.5 mole $R_2O_3$. The results also indicate that the relationship of the remaining moles of RO (0.76 to 0.80 moles of MgO, CaO, SrO and BaO) is critical. Of the compositions investigated, the example 1 ratio of these four alkali oxides shown in the above table as 26:21:16:14 has been found to be an optimum for firing on an alumina body at a temperature of about 2100° F. The ratio for said four oxides in example II is 35:21:16:6; in example III the ratio is 15:23:15:25 and in example IV the ratio is 37:19:16:5. Substantial variation of the ratio can cause devitrification and crazing of the glaze.

What I claim is:

1. A lead-free ceramic glaze useful for application to high alumina substrates consisting essentially of from 50 to 54 percent by weight $SiO_2$, from 5 to 8 percent by weight $Al_2O_3$, from 6 to 12 percent by weight $B_2O_3$, from 4 to 6 percent by weight CaO, from 2 to 8 percent by weight MgO, from 2 to 15 percent percent by weight BaO, from 5 to 8 percent by weight SrO, from 1 to 2 percent by weight ZnO, and from 4 to 6 percent by weight of a mixture of $Na_2O$, $K_2O$ and $Li_2O$.

2. A lead-free ceramic glaze useful for application to high alumina substrates consisting essentially of about 52 percent by weight $SiO_2$, about 6 percent by weight $Al_2O_3$, from 9 to 10 percent by weight $B_2O_3$, about 5 percent by weight CaO, from 4 to 5 percent by weight MgO, about 9 percent by weight BaO, from 6.5 to 7 percent by weight SrO, about 2 percent by weight ZnO and about 5 percent by weight of a mixture of $Na_2O$, $K_2O$ and $Li_2O$.

3. A ceramic glaze as claimed in claim 2 having present about 1.7 percent by weight $Na_2O$, about 3 percent by weight $K_2O$ and about 0.5 percent by weight $Li_2O$.

4. A lead-free ceramic glaze useful for application to high alumina substrates consisting essentially of RO, $R_2O$, $R_2O_3$ and $R_2$, said RO consisting of MgO, CaO, SrO, BaO and ZnO, said $R_2O$ consisting of $Li_2O$, $Na_2O$ and $K_2O$, said $R_2O_3$ consisting of $B_2O_3$ and $Al_2O_3$, and wherein said $RO_2$ is $SiO_2$, wherein the empirical molecular formula of said glaze, obtained by setting the sum of RO and $R_2O$ equal to one, can be expressed as 0.81 to 0.85 mole RO, from 0.15 to 0.19 mole $R_2O$, from 0.4 to 0.5 mole $R_2O_3$, and from 1.8 to 2.3 moles $SiO_2$, wherein ZnO is about 0.05 mole and the remaining RO total from 0.76 to 0.80 mole, of which MgO is about 0.15 to 0.37, CaO is about 0.19 to 0.23, SrO is about 0.15 to 0.16 and BaO is about 0.05 to 0.25.

5. A ceramic glaze as claimed in claim 4 wherein the MgO:CaO:SrO:BaO mole ratio is about 26:21:16:14.

6. A ceramic glaze as claimed in claim 5 wherein said formula can be expressed as about 0.82 mole RO, about 0.18 mole $R_2O$, about 0.46 mole $R_2O_3$ and about 2 moles $SiO_2$.

* * * * *

UNITED STATES PATENT AND TRADEMARK OFFICE

CERTIFICATE OF CORRECTION

PATENT NO. : 4,084,976

DATED : April 18, 1978

INVENTOR(S) : Jonathan W. Hinton

It is certified that error appears in the above-identified patent and that said Letters Patent are hereby corrected as shown below:

Column 5, line 3, substitute "$RO_2$" for - $R_2$ - .

Signed and Sealed this

*Tenth* Day of *June 1980*

[SEAL]

*Attest:*

SIDNEY A. DIAMOND

*Attesting Officer* *Commissioner of Patents and Trademarks*